No. 718,811. PATENTED JAN. 20, 1903.
J. H. BAKER.
MANUFACTURE OF CHAINS.
APPLICATION FILED FEB. 3, 1902.
NO MODEL.

WITNESSES:
Robert Bradley.
Fred Kirchner.

INVENTOR
James H. Baker
by Darwin S. Wolcott Att'y.

THE NORRIS PETERS CO., PHOTO-LITHO., WASHINGTON, D. C.

UNITED STATES PATENT OFFICE.

JAMES H. BAKER, OF ALLEGHENY, PENNSYLVANIA, ASSIGNOR TO JAS. H. BAKER MANUFACTURING COMPANY, OF ALLEGHENY, PENNSYLVANIA, A CORPORATION OF PENNSYLVANIA.

MANUFACTURE OF CHAINS.

SPECIFICATION forming part of Letters Patent No. 718,811, dated January 20, 1903.

Application filed February 3, 1902. Serial No. 92,411. (No model.)

*To all whom it may concern:*

Be it known that I, JAMES H. BAKER, a citizen of the United States, residing at Allegheny, in the county of Allegheny and State of Pennsylvania, have invented or discovered certain new and useful Improvements in the Manufacture of Chains, of which improvements the following is a specification.

The invention described herein relates to certain improvements in welding links for chains, &c., and has for its object the provision of maximum welding-surfaces without increasing the length of the scarf and the protection of such surfaces as against injury or reduction during the heating of the scarfed portions to a welding temperature.

Figure 1:
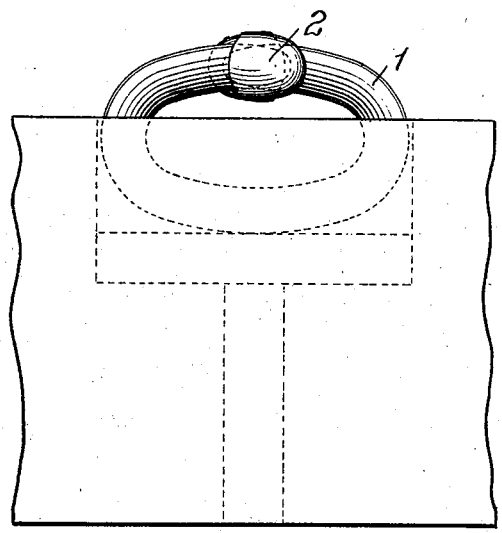
Figure 2:
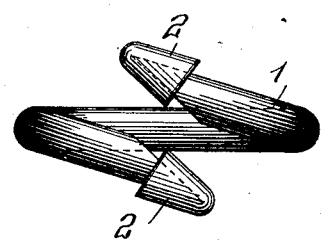
Figure 3:
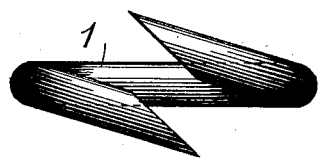
Figure 4:
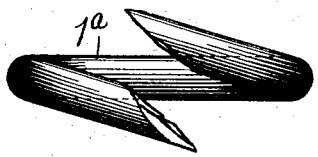
Figure 5:
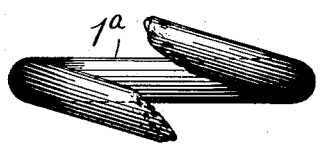

In the accompanying drawings, forming a part of this specification, Figure 1 is a view of a portion of a heating-furnace, showing the link in position to be heated. Fig. 2 is a view of a link with protecting-cap on its ends. Fig. 3 is a view of a link having properly-scarfed ends, and Figs. 4 and 5 are views of links having the scarfed ends deformed.

It has heretofore been the practice in making and welding links to form the scarf by shearing the bar transversely in a plane forming an acute angle with the axis of the bar. As is well known by all metal workers, the portions of the bar adjacent to the plane of shear are deformed by the compressive action of the shear-blades, so that faces formed by shearing are greatly reduced in area, as illustrated in Fig. 4, and the portion of the link at the weld has a transverse area less than that of other portions of the link, and, further, when the scarfed blank is placed in the furnace to heat the ends to welding temperature the thin points and edges are burned away, thereby further reducing the area of the surfaces to be united, as shown in Fig. 5, and frequently the weld is rendered defective by the inclusion between the weld-surfaces of portions of burned metal.

In the practice of my invention the scarfs on the ends of the blank are formed by sawing or so cutting the bar as to avoid any compression or deformation of the portions adjacent to the plane of cut, thereby insuring maximum areas for the planes in which the cut is made, as shown in Figs. 2 and 3. The bars may be scarfed by shearing, in which case the deformed portions should be removed.

It will be observed by reference to Fig. 2 that the peripheral edges of the ends 1 thus formed on the blank are very thin, so that if subjected to the cutting action of the flame, &c., in the welding-furnace these edges will be burned away before the body of the end portions can be raised to a welding temperature. In order to prevent the destruction of the edges and also to keep the surfaces to be united clean during the heating, caps 2, of clay or other suitable material, are placed on the ends of the blank. These caps may be formed ready to be slipped onto the ends of the blank or the heater may apply a coating of clay or other material in a plastic condition before placing the blanks in the furnace. The caps or covers should not be made so thick as to prevent a rapid heating of the ends, but should be sufficiently thick to prevent cracking off when highly heated. When the heated blanks are withdrawn from the furnace, the caps or covers can be easily slipped off by a sharp blow or scraped off, leaving the exposed ends of the blank clean and bright for the welding operation.

I claim herein as my invention—

1. As an improvement in the art of making links, the method herein described, which consists in so forming the scarfs as to produce a maximum area for a given scarf, protecting the scarfed ends from injury and diminution while being heated to a welding temperature, removing the protector from the heated ends and welding such ends, substantially as set forth.

2. As an improvement in the art of making links, the method herein described, which consists in protecting the scarfed ends of the link from injury and diminution while being heated to a welding temperature, removing the protector from the heated ends and welding such ends, substantially as set forth.

In testimony whereof I have hereunto set my hand.

JAMES H. BAKER.

Witnesses:
DARWIN S. WOLCOTT,
F. E. GAITHER.